March 6, 1951 A. EDELMAN 2,544,012
INDICATING AND CONTROL DEVICE
Filed Dec. 11, 1944 4 Sheets-Sheet 1

INVENTOR.
ABRAHAM EDELMAN
John C. Kerr
ATTORNEY

March 6, 1951     A. EDELMAN     2,544,012
INDICATING AND CONTROL DEVICE Filed Dec. 11, 1944     4 Sheets-Sheet 3

INVENTOR.
ABRAHAM EDELMAN
BY John C. Kerr
ATTORNEY

March 6, 1951     A. EDELMAN     2,544,012
INDICATING AND CONTROL DEVICE
Filed Dec. 11, 1944     4 Sheets-Sheet 4

INVENTOR.
ABRAHAM EDELMAN
BY
John C. Kerr
ATTORNEY

Patented Mar. 6, 1951

2,544,012

UNITED STATES PATENT OFFICE 2,544,012

INDICATING AND CONTROL DEVICE

Abraham Edelman, New York, N. Y., assignor to The Liquidometer Corporation, Long Island City, N. Y., a corporation of Delaware Application December 11, 1944, Serial No. 567,704

19 Claims. (Cl. 73—304)

This invention relates to improvements in indicating and control devices, particularly to improvements in circular arrangements for the operation of such devices by means of condenser-type transmitters, the condenser portion of which is placed in a medium such as a liquid to be measured.

One object and feature of this invention is to provide a device having a minimum number of parts.

Another object and feature of the invention is to provide an indicating and control device which is responsive to and controlled by relative energy outputs of means for providing alternating current which are controlled by changes of a unit to be measured.

Another object and feature of the invention is to provide a device that will give direct indications on a suitable indicator and which will also provide for a direct reading of a quantity of the medium to be measured without the necessity of making any manual setting.

Another object and feature of the invention is to provide a circuit arrangement which can be operated from a low D.-C. supply voltage as may be found in present aircraft practice, and which is essentially independent of line voltage variations which would otherwise cause errors in the readings.

Another object and feature of the invention is to provide circuit arrangements which will operate various types of indicating elements such as milliammeters, electrodynamometers, ratiometers, and electron indicators; with a preferred embodiment of the invention a ratiometer may be operated through a wide angle of rotation.

Another object and feature of the invention is to provide a device that does not require any moving elements in the transmitter portion placed in the liquid or other medium to be measured.

Another object and feature of the invention is to provide means for furnishing a volumetric scale on the indicator which is uniform or distorted in any desired manner.

Another object and feature of the invention is to provide means for measuring and totalizing the contents of tanks of different shapes, and indicating the total contacts upon one indicator.

Another object and feature of the invention is to provide a measuring device, the indications of which are substantially insensitive to changes of fluctuations in the supply voltage, and of the temperature of the medium the volume or level of which is to be gauged.

Other and further objects of the invention will appear hereinafter and in the appended claims forming a part of the specification.

In the accompanying drawings several embodiments of the invention are shown by way of illustration and not by way of limitation.

Figures 1, 2, 3, 4, 5:
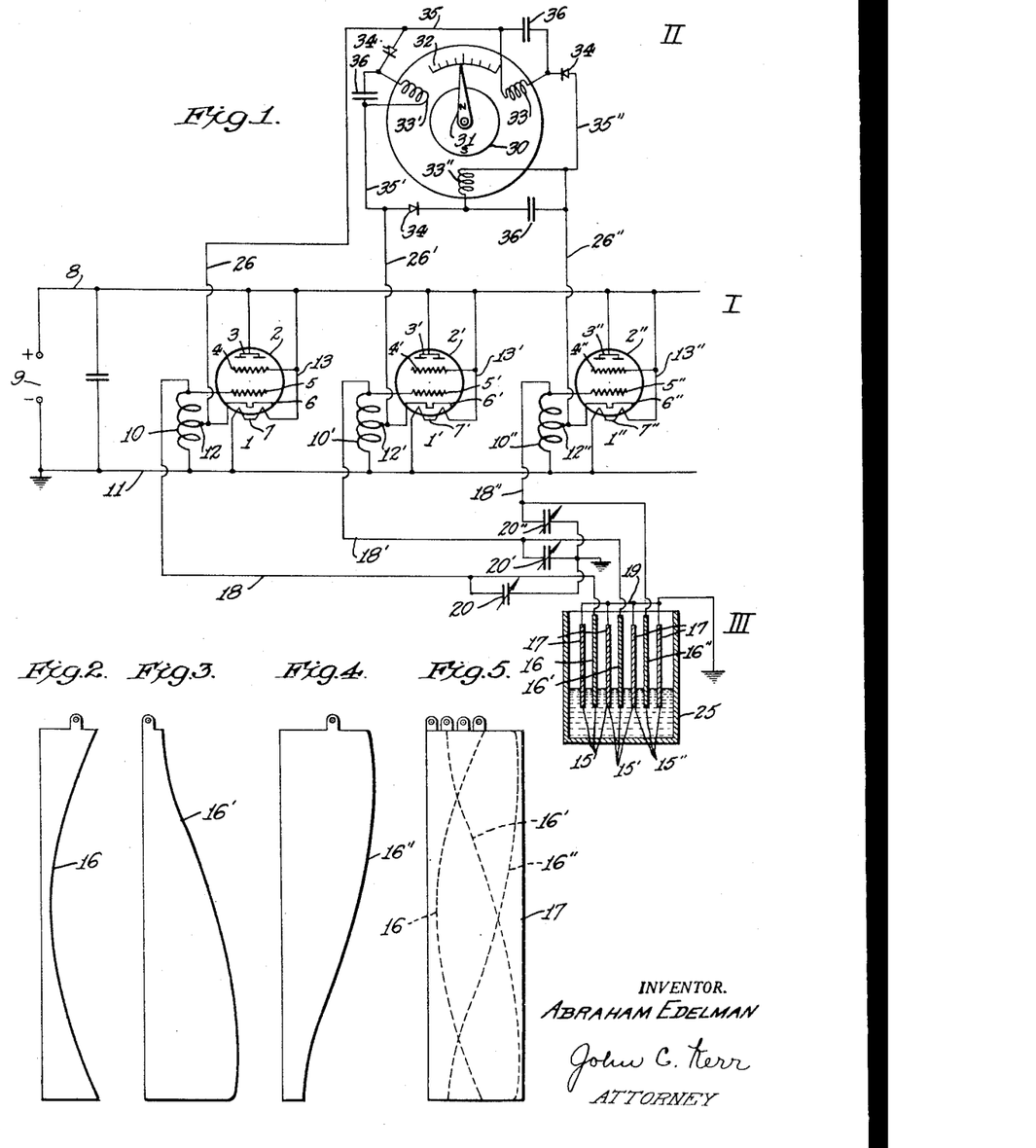
Fig. 1 is a type of circuit suitable for the operation of a ratiometer having three coils displaced 120° around a permanent-magnet rotor.
Figs. 2, 3 and 4 illustrate differently shaped plate electrodes to be used in conjunction with an indicating and control device according to the invention.
Fig. 5 is an assembly of the plates shown in Figs. 2, 3 and 4 together with rectangular intermediate plate electrodes.

The device and circuit diagram shown in Fig. 1 consists substantially of means for providing alternating current generally designated I and an indicating means generally designated II. The current providing means I includes a condenser type transmitter generally designated III, the capacitance of which varies corresponding to a medium such as a liquid to be measured and is used to control the indications of indicating means II in response to changes of the medium to be measured.

The alternating current providing means I are illustrated as three similar oscillators 1, 1', 1", each oscillator comprising an electron tube 2, 2', 2", respectively. The tubes are shown as double tubes, such tubes being more powerful but single tubes can also be used. Each tube includes a plate 3, 3', 3", respectively, a screen grid 4, 4', 4" respectively, a control grid 5, 5', 5", respectively, a cathode 6, 6', 6", respectively, and a heater 7, 7', 7" respectively. As will be noted the two similar elements of the double tubes are designated by single character references to simplify the description. The plates 3, 3', 3" respectively are connected to the positive line 8 of a source of D.-C. current 9. The screen grids 4, 4', 4" are also connected to the positive supply line 8. The control grids 5, 5', 5" are each connected to one end of tank coils 10, 10', 10", respectively. The other ends of these tank coils are connected to the grounded negative line 11 of the supply of current 9. The cathodes 6, 6', 6" are connected to center taps 12, 12', 12" respectively of the tank coils. The heaters 7, 7', 7" are connected across positive and negative supply lines 8, 11, respectively of the source of current 9 by leads 13, 13', 13".

The condenser type transmitter III comprises three condensers 15, 15', 15" corresponding to the number of oscillators. However, it is also possible to provide a greater or smaller number of condensers than oscillators. The condenser units 15, 15', 15" are composed of one set of plate electrodes 16, 16', 16" and a second set of plate electrodes all designated 17. Each plate electrode 16, 16', 16", respectively is placed between two plate electrodes 17. The plate electrodes 17 are all of equal, preferably rectangular shape, while the plate electrodes 16, 16', 16" are differently shaped. As a result the condensers which are formed by plate electrodes 16, 16', 16" surrounded at both sides by plate electrodes 17 will have different capacitances.

The plate electrode 16 is connected by a lead 18 to one end of the tank coil 10, plate electrode 16' is connected by a lead 18' to one end of tank coil 10' and plate electrode 16" is connected by a lead 18" to one end of tank coil 10". The plate electrodes 17 are connected together by a common lead 19 and grounded. Each condenser is shunted by a grounded variable trimmer condenser 20, 20', 20", respectively, for purposes of adjustment.

The shape of the differently shaped condenser plates 16, 16', 16" and the purpose of providing condensers having different capacitances will be explained more fully hereinafter.

In operation the condenser assembly of the condenser transmitter III is placed in a preferably grounded tank 25 or other suitable container containing a material or fluid, for example liquid, the level or volume of which is to be measured. The capacitances of the condensers 15, 15', 15" are then determined by the size and shape of the plate electrodes 16, 16', 16" and by the dielectric between them.

The oscillators are connected by leads 26, 26', 26" to the indicating means II. The indicating means are illustrated as a ratiometer of the type having stationary coils and a permanent magnet rotor. In this connection it should be noted that the term "ratiometer" as herein used shall include crossed stationary coil instruments having two or more coils and a magnetizable armature with or without magnetizing coils for the armature itself, crossed movable coil instruments having two or more coils and a stationary magnetic field, ratio indicating instruments of the moving coil type in which the coil moves into weaker or stronger magnetic fields from a permanent stationary magnet, toroidally wound stationary coil instruments, and all similar type instruments.

The ratiometer illustrated in Fig. 1 comprises a permanent magnetic rotor 30 magnetized across a diameter and supporting a pointer 31 associated with a scale 32. The rotor 30 is placed within a group of three coils 33, 33', 33", symmetrically disposed around the rotor so that the magnetic fields from these three coils can act upon the rotor 30 and cause it to turn into the direction of the resulting magnetic field. Since the illustrated design of a ratiometer is connetced to operate from direct current only, rectifiers 34 are provided which are connected between each two coils by leads 35, 35', 35", respectively. It is preferable to provide condensers 36 in parallel with each coil 33, 33', 33' to filter the current through those coils.

As will be seen from Fig. 1, the leads 26, 26', 26" are connected at one end to center taps 12, 12', 12" of the tank coils 10, 10', 10" and at the other end to symmetrical junctions of a delta or ring, each arm of which includes one rectifier 34 in series with a ratiometer coil, and one condenser 36, shunting the corresponding coil. By this connection a coupling path is provided between each pair of leads 26, 26', 26" and this coupling path includes one arm of the delta as just described.

In operation each oscillator performs in a conventional manner as a Hartley oscillating circuit to generate an A.-C. voltage in the tank coils 10, 10', 10". Since the three oscillators are similarly constructed and since they are coupled together through the leads 26, 26', 26" they tend to oscillate at a common frequency determined by the constants of their tank coils and the capacitances of the condensers of transmitter III.

As mentioned before the condensers 15, 15', 15" are not identical. However, in order to facilitate the description of the oscillator circuit, it shall be assumed for the time being that the condensers of the transmitter are of identical capacitance and that the trimmer condensers 20, 20', 20" are adjusted to have identical capacitance values. Then the three oscillators are alike in all respects and will readily oscillate at the same frequency without requiring any transfer of energy through leads 26, 26', 26" except perhaps a very slight and negligible amount caused by minor differences in the circuit.

Under these conditions no currents will flow through the coupling arms of the delta connection of the ratiometer coils. However, if any one of the condensers 15, 15', 15" is now varied in capacitance relative to the other condensers of the transmitters then a current will flow in the coupling arms, i. e., in coils 33, 33' and 33". This current is approximately proportional to the capacitance differences introduced and is the result of a phase displacement of the oscillator for which the capacitance was changed.

It has been previously mentioned that the plate electrodes 16, 16', 16" which are placed in the fluid to be measured are differently shaped and that the changes in capacitance caused thereby in response to variations of the fluid to be measured are used to control the indications of the ratiometer. This part of the invention shall now be explained more fully.

Figs. 2, 3 and 4 show possible useful shapes of plate electrodes 16, 16', 16''. As will be seen from the drawings each plate has a side which is shaped to conform to a portion of a sine curve while the remaining three sides may be straight or also shaped. Each portion of a sine curve on any one plate includes 180 degrees of the sine curve. Each plate is furthermore displaced 120 degrees from the next plate so that it includes a 180 degree portion of a sine curve which is everywhere 120 degrees displaced from each of the two other plates.

As previously mentioned, plate electrodes 16, 16', 16'' are assembled by interleaving rectangular shaped electrode plates 17, which are interconnected by common lead 19. Consequently each condenser 15, 15', 15'' comprises a shaped plate 16, 16', 16'' surrounded at both sides by rectangular plates 17 (see Fig. 5). The capacitances of these condensers are determined by the size and shape of plates 16, 16', 16'' and by the dielectric between them. Let it be assumed that initially the dielectric material be air having a dielectric constant of one and that a liquid with an apparent dielectric constant $k$ rises from the bottom of the assembly of plates gradually displacing the air. When the liquid has partly displaced the air then the capacitance in each condenser is somewhat less than $k$ times its capacitance with air as dielectric. When the liquid has fully displaced all the air then the capacitance in each condenser is $k$ times its capacitance with air as dielectric. Due to the shaping of the plates 16, 16', 16'', each plate being different from the others, the capacitances of the three condensers will not increase uniformly but at different rates. By actual measurement it has been found that the rate of change of capacitance with liquid level is proportional to the width of a shaped plate; and since the width of a shaped plate is a sine function of the liquid level, the rate of change of capacitance with liquid level is also proportional to a sine function of the level.

It has further been found that the current flowing in each of the leads 26, 26', 26'' connecting the oscillators to the ratiometer is approximately proportional to the difference in capacitance between the condensers of the adjacent oscillators. As a result, liquid which rises in level along condensers having sine curve shaped plates causes currents to flow in the coupling leads 26, 26', 26'' which are sine functions of the liquid level also. With plates as shown in Figs. 2, 3, 4 and 5, the coupling currents vary in amplitude as three sine functions of the liquid level, spaced 120 degrees apart.

Figure 6:
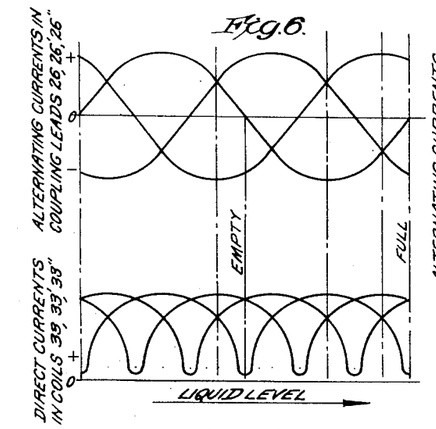
Fig. 6 is a chart showing how the currents between the oscillator cathodes of Fig. 1 vary with the height of a fluid to be measured in which the electrodes of the transmitter condenser assembly are placed.

Fig. 6 in its upper half shows the coupling currents as three sine functions of the liquid level, spaced 120 degrees apart. However, it should be noted that Fig. 6 shows only the amplitudes and not the phases of the three coupling currents. A reversed phase is indicated by the changed sign of the current. With plates as illustrated in Figs. 2 to 5 the currents (Fig. 6) at "Empty" correspond to a liquid level at the bottom of the plates; and the currents at "Full" correspond to liquid level at the top of the plates. The portions of the current chart which are outside of the region between Empty and Full are shown only to bring out the sine derivation. They would exist, however, if the plates 16, 16', 16'' were longer than shown and would include more than 180 degrees of a sine curve.

The differences in the currents in the leads 26, 26', 26'' appear as direct currents in the coils 33, 33', 33'' of the ratiometer. These direct currents have amplitudes proportional to those shown in the upper part of Fig. 6. Due to the rectifying properties of the circuit, however, the direct currents do not change sign, but remain positive and proportional to the alternating currents. This is shown clearly in the lower half of Fig. 6. Also, the rectified currents are of double frequency; that is, the change in liquid level corresponding to 180 degrees of the sine curve in the plates of the condensers now results in a change in the coil currents which corresponds to 360 degrees of a somewhat distorted sine curve.

Variations in coil currents such as these are capable of positioning the permanent magnet of the ratiometer through 360 degrees. It has been found, for example, that three direct currents varying in amplitude sinusoidally with an independent variable such as liquid level, and displaced 120 degrees from each other, will cause the resultant magnetic field acting on the permanent magnet rotor 30 to rotate through 360° for a change in level from "Empty" to "Full," so that the pointer will at all times be positioned according to the value of the independent variable, i. e. the liquid level. In the present case, due to the slight distortions of the rectified currents, the position of the rotor 30 may depart slightly from direct proportionality to the level; but this departure may be readily compensated for by a minor reshaping of the plates 16, 16' and 16'', and by specially calibrating the dial 32.

The disclosure of the present application, and particularly Fig. 1 thereof, should be considered as a variable static condition, rather than from a dynamic point of view. As such, the three primary circuits or first circuits, each of which include one of the oscillators 1, 1' and 1'', are arranged for generating alternating currents and for energizing the respectively associated condensers, including plates 16, 16' and 16'' respectively. From a theoretical point of view, these three first or primary circuits may be balanced due to their interlocking connections including the ground connection 11 to which the negative supply of the D. C. power source 9 is connected, and the positive supply line 8 from the positive source of the D. C. power supply and also due to the coupling connections comprising a second circuit means including the delta-connected coils 33, 33' and 33''. Thus, if the reactance of each of these first circuits were the same, due to the capacitors including plates 16, 16' and 16'' and the trimming condensers 20, 20' and 20'' all being adjusted or subjected to the same capacitance, these three primary circuits would be balanced and there would be no current flow through the coupling circuits including coils 33, 33' and 33''. Under these circumstances the three primary similar and balanced circuits would have the same frequency and be in phase with one another.

When, however, the reactances of the primary circuits are unbalanced, for example, by rise of the level of the liquid in which the condenser plates 16, 16' and 16'' are adapted to be immersed, there is caused current flow through the coupling means, including the coils 33, 33' and 33'', or some of them. Due to the peculiar shape of the condenser plates 16, 16' and 16'', as shown in detail in Figs. 2 to 5 inclusive, each of the three condensers will have its own individual characteristic curve of capacitance in respect to liquid level between the extreme limits of variation of such level from "Empty" to "Full" or vice versa. As such, therefore, for any given liquid level, there will be a specific and definite unbalance of the capacitances of the three primary circuits and hence of the respective reactances of such circuits. This unbalance will be substantially immediately reflected in a specific and definite disposition of current flow through the three coils 33, 33' and 33", of the secondary or coupling circuit means.

Due to the fact that each of these coils is in series with a rectifier shown at 34, current flow through each of these coils will be uni-directional. Thus each coil in the assumed instantaneously static situation will create a flow of magnetic flux in a particular and given direction or path. As the currents flowing through these coils is peculiar to the particular unbalance characteristic of the condition present, i. e. of the particular liquid level, there will be a particular and definite resultant magnetic field having a specific direction, which will be effective to react with the permanent magnet 30 of the rotor, which is transversely magnetized as stated. This permanent magnet rotor will thus align itself with the direction of the resultant magnetic field, so as to predetermine the position of the pointer 31.

As above stated, there will be a particular direction for the resultant magnetic field of the coils 33, 33' and 33" characteristic of each level, due to the differences in the characteristic capacitance curves of the three condensers. As such, therefore, as the level of the liquid moves from "Empty" to "Full" in the tank, the pointer 31 will be moved throughout its entire range of movement, i. e. from a position indicative of "Empty" to one indicative of "Full." In the instrument in question it is contemplated that this movement will be 360°. Due to the fact, however, that the coils 33, 33' and 33" are always subjected to uni-directional current flow respectively, there will never be a rotating magnetic field such as could cause a continuous rotation of the rotor 30 and pointer 31 as in a synchronous motor.

Figure 7:
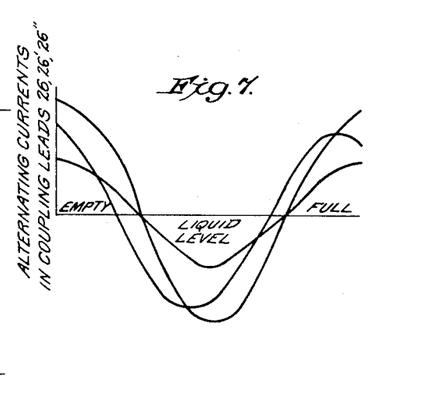
Figs. 7, 8 and 9 are similar charts showing how the currents between the oscillator cathodes of Fig. 1 may vary with the height of a fluid surrounding the electrodes of the transmitter condenser assembly.
Figures 8, 9, 10:
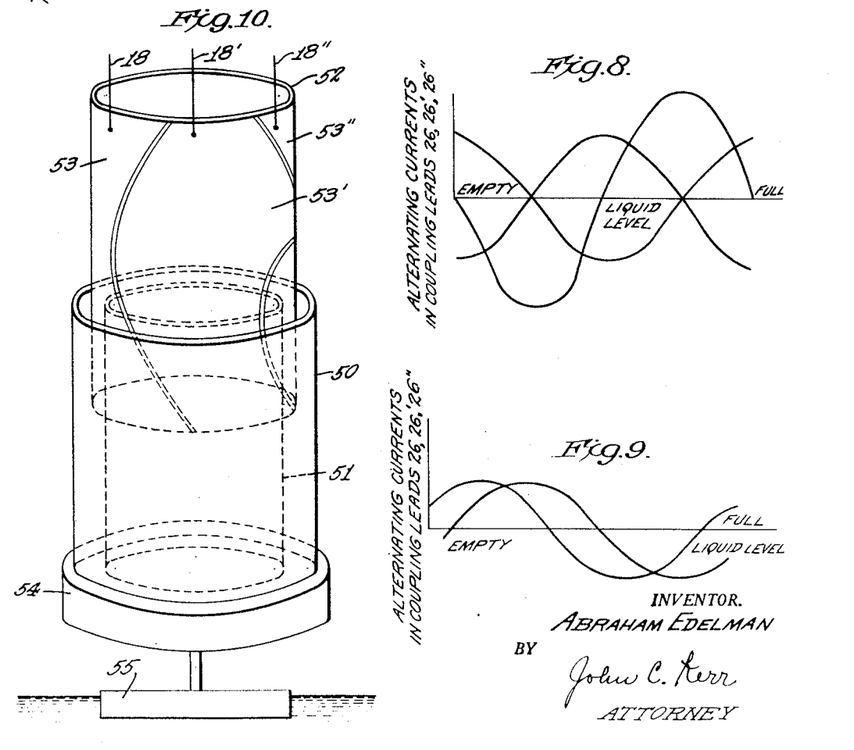
Fig. 10 is a modification of a transmitter condenser, said transmitter condenser being usable for the measurements of mechanical movements.

The rotation of the pointer 31 and rotor 30 does not require three direct currents displaced 120 degrees, but may be accomplished by an infinite variety of direct currents in the three coils. It is only necessary that the direction of the magnetic field resulting from these currents should be located in the desired manner proportional to the liquid level. For example, the same positioning of the resultant magnetic field in the instrument 11 will occur if the three coil currents vary in any of the modes shown in Figs. 7, 8 and 9 which are selected at random from an infinite series of such charts. In Fig. 7 two of the coil currents are proportional to each other, not being displaced at all; while the third current is displaced slightly, and all three currents having different amplitudes. In Fig. 8 two of the currents are displaced 180 degrees from each other, and are equal in amplitude while the third current is larger and displaced also. In Fig. 9 one of the coil currents is continuously zero, while the remaining two coil currents are slightly displaced from each other. All of these combinations of coil currents have been found to be capable of creating a resultant magnetic field having a direction proportional to the magnitude of a variable such as liquid level, to be indicated by the position of the permanent magnet rotor 30.

It should now be understood that each such combination of coil currents is obtainable from the circuit of Fig. 1, simply by shaping the plates in some other fashion from that shown in Figs. 2, 3, 4 and 5. Consequently, the shapes shown are not the only possible ones, but all shapes in which differences are maintained between three plates of an assembly will cause proportional positioning of rotor 30.

Furthermore, it is not necessary to employ all three of the coupling currents to operate the coils of the ratiometer. Fig. 9 shows that suitable rotation will occur if one of the coil currents is maintained continuously at zero, while the remaining two currents are displaced 60° degrees with respect to the independent variable of liquid height.

It should also be apparent that ratiometers with two coils may be operated from this circuit, and that the two coils may be displaced around the permanent magnet rotor by any angle found to be desirable; for example, by two coils displaced 90 degrees from each other. Also, that four, five and six coil ratiometer designs may be made to operate with equally good results.

As it will appear from the previous description the movements of rotor 30 of the indicator are not controlled by the absolute values of current fed to the ratiometer but by relations between the coil currents. Any changes in temperature and fluctuations in the supply voltage will affect all the capacitances included in the circuit system and thus the energy output of the oscillators, and will cause such changes of the currents flowing through the coils of the ratiometer that the indications of the ratiometer remain approximately unchanged. Consequently, the indications of the ratiometer are substantially insensitive to change in temperature, fluctuations in the supply voltage, etc.

While Fig. 1 shows a circuit arrangement employing three oscillators, it should be understood that circuit arrangements employing two means providing alternating current or more than three current providing means are entirely possible as long as two current providing means each associated with one transmitter condenser are provided and the current providing means control a ratiometer or another indicator responsive to relative current values rather than to absolute current values. Such indicator will be substantially insensitive to changes in temperature and supply voltage as previously explained.

In the previous specification indicating instruments have been described which require rectification. However, instrument movements are well known in the art which operate directly from alternating current. It should be understood that circuits of the type shown in Fig. 1 are entirely capable of operating instruments directly responsive to alternating current. This can be accomplished by simply omitting the rectification.

Thus far in the explanation, the level of a non-conductor liquid dielectric in a container such as tank 25 has been assumed as the independent variable to be measured, and a condenser set has been shown which is capable of responding with change in capacitance to a change in this level. However, it is equally satisfactory to employ a conducting liquid in place of a non-conducting liquid. In this event the plate electrodes required to be coated with a non-conducting layer so that a condenser may be formed between the plates and the liquid the level of which is to be measured. The combination of a conducting liquid and the non-conducting layer or layers will provide "an apparent dielectric constant" for the liquid and the circuit will operate and respond in the same manner as previously described.

It should be understood that indicating and control devices according to the invention can be used to measure any changes of a unit that are capable to be translated into capacitance difference.

Fig. 10 illustrates a structure which can be used to measure mechanical movements caused in any manner, including changes in temperature. According to Fig. 10, the transmitter condenser which corresponds in effect to the assembly III shown in Fig. 1, comprises an outer cylinder 50 made of conducting material, an inner cylinder 51 made of conducting material, a cylinder 52 made of insulating material and centered between cylinders 50 and 51. Insulating cylinder 52 supports three conducting elements 53, 53', 53", which correspond to plate electrodes 16, 16', 16". The conducting elements 53, 53', 53" are preferably sine shaped similar to the elements shown in Figs. 2, 3 and 4. The conducting elements can be formed by applying a conductive coating to cylinder 52 and separating this coating into three conducting elements by division lines as indicated in Fig. 10.

The three elements are connected by leads 18, 18', 18" to a circuit such as shown in Fig. 1 or to any other suitable circuit within the scope of the invention.

Cylinder 52 may be stationary while cylinders 50 and 51 are axially movable relative to cylinder 52. As shown in Fig. 10, cylinders 50 and 51 are supported by a base 54, the position of which is controlled by a unit to be measured, for example, by the movements of a float 55, by the movements of a bimetal coil or a bimetal strip, or by the movements of the liquid of a thermometer. Many arrangements of this type are known in the art and are not part of this invention.

Indicating and control devices according to the invention can further be used for measuring the volume of the contents of tanks or containers of various cross-sections. In a tank having straight sides such as tank 25 shown in Fig. 1, the liquid level is proportional to the liquid volume so that the pointer 31 will respond by turning in a manner approximately proportional to the liquid volume. In a tank of any other cross-section, however, such as the circular one shown in Fig. 11, the liquid level is not proportional to the liquid volume. For such tanks it is entirely practicable to modify the shape of the plates in the condenser so that the rotated position of the pointer 31 is indicative of liquid volume instead of liquid level. Such a modification of the sine shaped plate electrodes is shown in Fig. 12 for the circular tank shown in Fig. 11.

Figure 12:
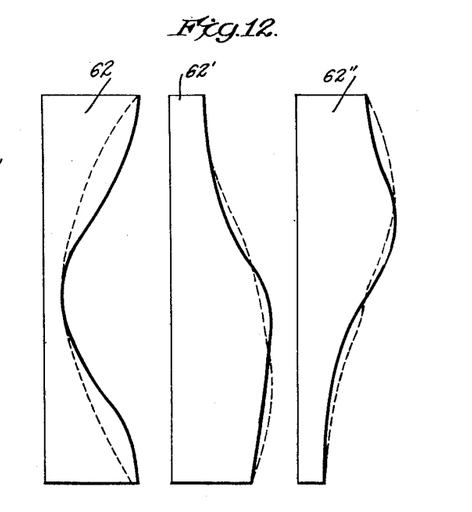
Fig. 12 shows three plate electrodes of a transmitter condenser to be used in conjunction with a tank as shown in Fig. 11.

Fig. 12 shows plate electrodes for a tank having straight walls in dotted lines while the configuration of the plates corresponding to the circular shape of the tank is shown in full lines. As it is apparent from Fig. 12 the modifications of the plate shapes consist in retarding the changes in width of each plate at the top and bottom with changes in height, and in causing the changes in width of each plate at the center to change faster with height. Thus the pointer 31 is moved through a smaller angle at the top and the bottom positions of the liquid level and through a larger angle at center positions for a given change in liquid level respectively, all to a degree corresponding to the actual shape of the tank.

By such modifications of the plate shapes it is possible to obtain a rotation of pointer 31 which is proportional in angular extent to liquid volume rather than to liquid level; similarly the rotated position of the pointer may be made to correspond to liquid volume with part of the scale associated with the pointer expanded at will, while other parts of the scale are compressed. It will be obvious from the previous specification that such flexibility is easily obtainable by modifying the relationships between the condensers.

Figure 11:
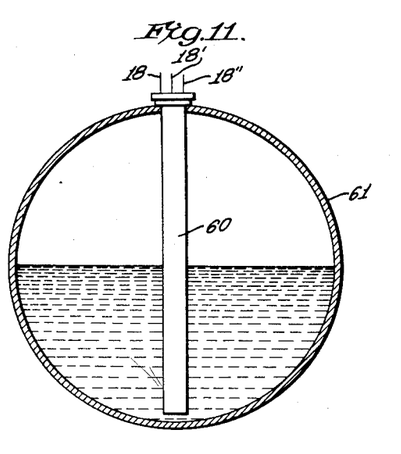
Fig. 11 is a cross-section of a cylindrical tank in which a transmitter condenser according to the invention is placed.

According to Fig. 11 the condenser assembly generally designated by 60 is placed in a tank 61 of circular cross section in a vertical plane and filled with a liquid, the volume of which is to be measured. The three shaped plate electrodes 62, 62', 62" may be connected by leads 18, 18', 18" to a circuit as shown in Fig. 1 or any other suitable circuit according to the invention.

Figure 13:
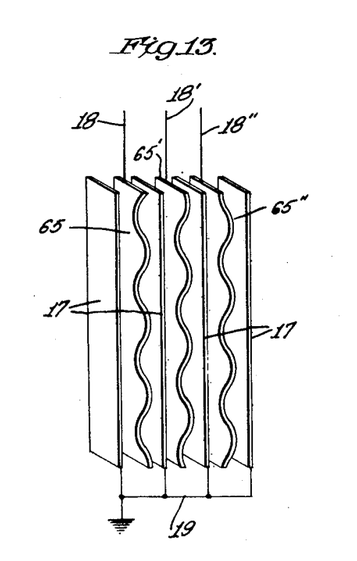
Fig. 13 is another modification of a transmitter condenser according to the invention, said condenser including waved plate electrodes.

In the previous portion of this specification, plate electrodes have been described with which the desired changes in capacitances are obtained by giving at least one of the sides of the plates a sine shape. However, it should be well understood that the invention is not limited to plates having one or more sides sine or otherwise shaped. It is entirely possible, within the scope of the invention, to use plates having a rectangular shape and to corrugate these plates or to give them a waved shape as shown in Fig. 13. This figure illustrates three waved plates 65, 65', 65" which are arranged in such manner that the peaks of the waves of the plates are displaced relative to each other. Each waved plate is placed between two rectangular plates 17 grounded by common lead 19. Plates 65, 65', 65" are connected by leads 18, 18', 18" to a circuit such as shown in Fig. 1 or any other suitable circuit within the scope of the invention.

Instead of obtaining the desired changes in capacitances by shaping one set of the plate electrodes, it is possible within the scope of the invention to obtain this result by the positions of one set of plates relative to the other set.

Figure 14:
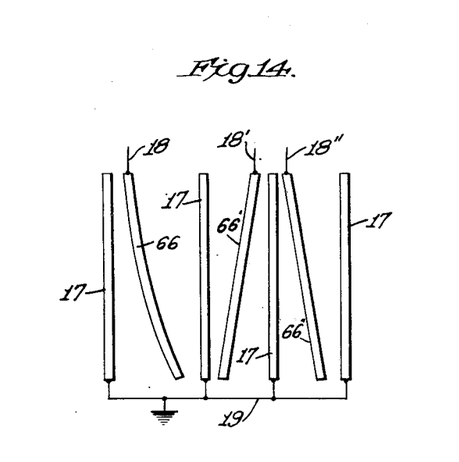
Fig. 14 is still another modification of a transmitter condenser according to the invention.

Fig. 14 shows an arrangement in which ordinary rectangular plates 66, 66', 66" are used which are tilted at different angles relative to grounded plates 17. By using proper angular positions of plates 66, 66', 66" the desired changes in capacitances can be obtained.

It should be understood that the various illustrated features of the plate electrodes can be also combined to obtain best results.

Figure 15:
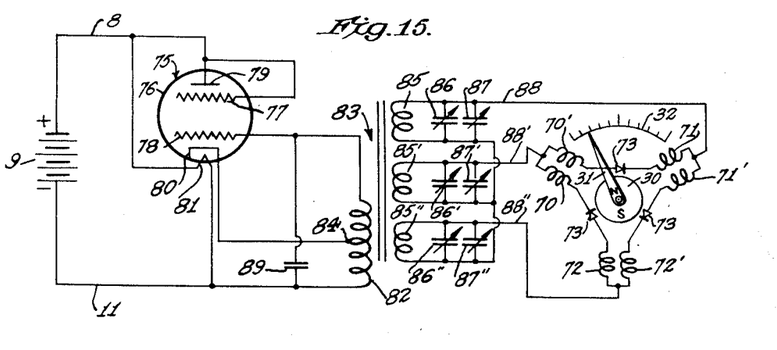
Fig. 15 is a modification of a circuit diagram suitable for the operation of an indicating and control device according to the invention.

Fig. 15 shows a second circuit according to the invention in which a six-coil ratiometer and a single oscillator are used. The use of a six-coil ratiometer permits the reversal of the resultant magnetic flux from a pair of coils since each coil of a pair has current flowing through it in two different directions.

According to Fig. 15 the ratiometer has three pairs of coils 70, 70'; 71, 71'; 72, 72', respectively. The coils of each pair are shown as being wound together; however, it is also possible to wind the coils directly opposite each other. It is necessary only that the flux from the two coils in each group will be in line with each other and that the coils be connected so that the fluxes oppose each other. Rectifiers 73, are provided between the pairs of coils which convert the A.-C. fed to the ratiometer into D.-C. of the correct polarity in a manner similar to that described in connection with Fig. 1.

The energy is supplied to the ratiometer by means of an oscillator generally designated 75. The oscillator comprises an electron tube 76, including a screen grid 77, a control grid 78, a plate 79, a cathode 80 and a heater 81. Plate 79 is connected to the positive terminal of the source of supply 9. Control grid 78 is connected to one end of a winding 82 of a transformer generally designated 83. The other end of the winding 82 is connected to the negative terminal of the source of current. The cathode is connected to a center tap 84 of winding 82. A condenser 89 is connected parallel to winding 82, between the negative terminal of the source of current and control grid 78. The output of oscillator 75 will energize winding 82. Transformer 83 has three secondary windings 85, 85', 85''. A condenser 86, 86', 86'', respectively, is connected in parallel with each secondary winding. These three condensers form the transmitter condenser and may correspond to the condenser assembly shown in Fig. 1. Trimmer condensers 87, 87', 87'', respectively, may be provided for each condenser 86, 86', 86'' for adjusting the capacitances in each branch.

The result of the changes in the capacitances across each secondary winding is to shift the phase of the terminal voltages of the secondary windings. As the level of a fluid such as liquid between the plates of the condenser transmitter rises as described in connection with Fig. 1, and thereby increases the capacitances between the electrodes of the condensers of the condenser transmitter, one secondary terminal voltage after another assumes the lead as a result of the changes in the capacitance loading of the secondaries. The condensers 86, 86' 86'' are connected by coupling leads 88, 88', 88'' to the connected ends of the three pairs of the ratiometer coils. Because of the differences in phase between the three secondary terminal voltages, coupling currents exist in the coupling leads which vary with the liquid level and cause a corresponding rotational positioning of the ratiometer pointer 31 in accordance with the resultant directional magnetic flux of all the coils as explained in connection with Fig. 1.

In the previously described circuit diagrams arrangements have been shown for indicating the content of one tank. However, the device according to the invention can also be used for totalizing the contents of two or more tanks by means of a single ratiometer which will then indicate the combined contents of two or more tanks. This result can be obtained by employing a parallel connection of the condenser transmitters, one condenser transmitter being provided for each tank.

Figure 16:
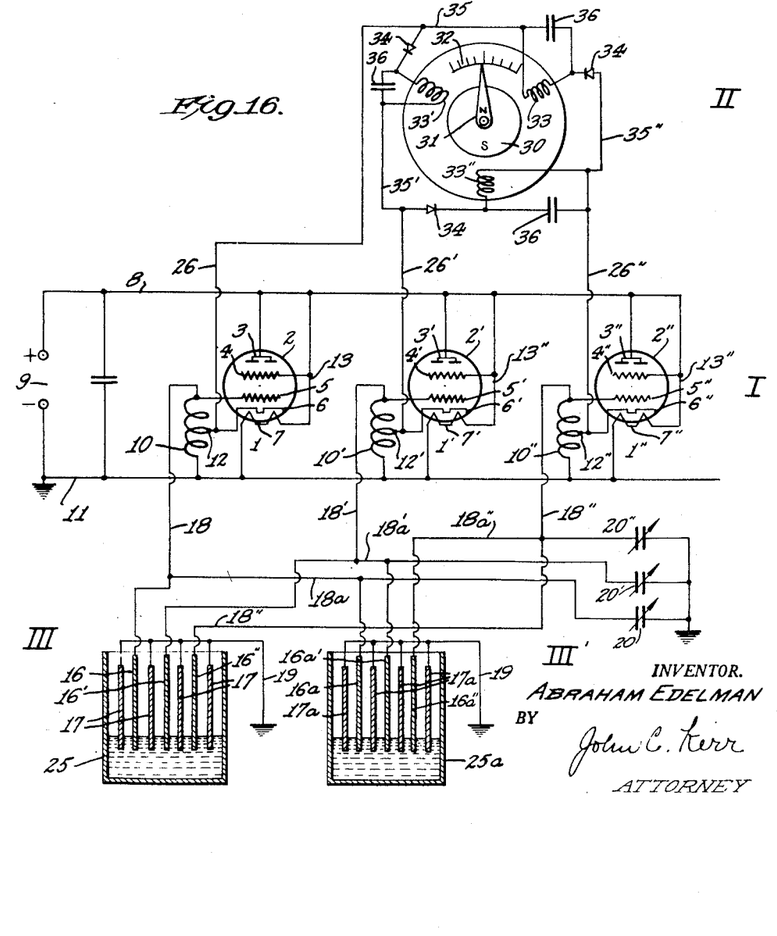
Fig. 16 is a circuit diagram suitable for the operation of an indicating and control device according to the invention for totalizing the contents of several tanks.

Fig. 16 illustrates a circuit arrangement for totalizing the contents of two tanks 25, 25a. The same numerals denote the same elements as in Fig. 1.

The oscillators 1, 1', 1'' are similar to those used in Fig. 1. The ratiometer may be similar to the ratiometer illustrated in Fig. 1 so that a description of those elements in detail appears not to be necessary.

The condenser transmitters which are generally designated III and III' are connected in parallel through leads 18, 18', 18'' and 18a, 18a', 18a''.

Each set of condensers formed by plates 16, 16', 16'', 17 and 16a, 16a', 16a'', 17a, respectively, of the transmitter condensers is preferably so modified that pointer 31 will rotate a uniform amount per gallon for all levels of the liquid. This can be easily accomplished by proper shaping of the plate electrodes of the condensers as previously described. It will then be found that the contents of both tanks may be varied in any manner, and that the ratiometer will properly indicate the total contents of both tanks.

While the invention has been described in detail with respect to certain particular embodiments, it will be understood by those skilled in the art after understanding the invention, that various changes and modifications may be made without departing from the scope of the invention and it is intended therefore to cover all such changes and modifications in the appended claims.

What is claimed is:

1. An indicating and control device for supervising a variable physical magnitude, comprising three means, each including a circuit for providing an alternating current, said current providing means being capable of operating in a certain phase relationship, circuit means electrically coupling said current providing means together for providing a path for a flow of energy between the current providing means, a variable impedance means connected respectively in circuit with each of said current providing means, the relative impedance values of all said impedance means being controlled by the same variable physical magnitude to be supervised, said variable impedance means being dissimilar, so that the impedance values thereof are respectively different functions of said variable physical magnitude, for causing the current providing means to produce a flow of energy through the coupling means in response to a change of the phase relationships between the current providing means caused by a change in said relative impedance values, and indicating means controlled by the said flow of energy in said coupling circuit means to indicate said variable physical magnitude.

2. An indicating and control device for measuring a physical magnitude, comprising three means for providing three alternating currents having a common frequency, circuit means including electric conductors electrically connecting and coupling said current providing means together for providing a path for a flow of electrical current energy between the current providing means, a capacitor connected in circuit with each of the current providing means so as to control the reactance of the alternating current provided thereby, means for varying the capacitance of one of said capacitors relative to the capacitances of the other capacitors in a predetermined manner in response to changes in the physical magnitude to be measured, thereby causing the current providing means to produce a flow of energy through the coupling means, and indicating means controlled by the said flow of energy in said coupling means for indicating said physical magnitude.

3. A liquid level indicating device, comprising three means for providing three alternating currents having a common frequency, circuit means electrically coupling said current providing means together for providing a path for a flow of energy between the current providing means, a capacitor connected in circuit with each of the current providing means, said capacitors having spaced electrodes and being arranged to be immersed in the liquid, the level of which is to be indicated, to an extent dependent upon the level of said liquid, the electrodes of one of said capacitors being arranged and shaped to cause changes of the relative capacitances of the capacitors in response to changes in the liquid level between the spaced electrodes, thereby causing the current providing means to produce a flow of energy through the coupling means, and indicating means controlled by the said flow of energy in said coupling means to indicate liquid level.

4. Indicating and control device for supervising a liquid level, comprising three means providing three alternating currents having a common frequency, circuit means electrically coupling said current providing means together for providing a path for a flow of energy between said current providing means, a capacitor connected in circuit with each of said current providing means, said capacitors having spaced electrodes and being arranged to be immersed in the liquid to an extent dependent upon the level thereof, the electrodes of one of said capacitors being arranged and shaped to cause changes in the relative capacitance of the capacitors in response to changes of the liquid level between the electrodes, thereby causing said current providing means to produce a flow of energy through the coupling means, and indicating means controlled by the said flow of energy in said coupling means.

5. An indicating and control device for supervising a variable physical magnitude, comprising three oscillators capable of being synchronized as to frequency, three alternating current circuits including said oscillators respectively, circuit means electrically coupling said oscillators and their respective alternating current circuits together for providing a path for a flow of energy between said oscillators, a variable impedance means connected in circuit with each of said oscillators, the relative impedance value of said impedance means being controlled by the physical magnitude to be supervised, thereby causing the oscillators to produce a flow of energy through the coupling means in response to said relative impedance value to maintain the oscillators at a common frequency, and indicating means controlled by said flow of energy in said coupling means for indicating said physical magnitude.

6. An indicating and control device for supervising a variable physical magnitude, comprising three means for providing three alternating currents having a common frequency, circuit means electrically coupling said current providing means together for providing a path for a flow of energy between said current providing means, said coupling means including a coil connected between each two current providing means and arranged to transfer energy between two respective current providing means, a variable impedance means connected respectively in circuit with each of said current providing means, the relative impedance values of said impedance means being varied by a change in the same variable physical magnitude to be supervised, said variable impedance means being dissimilar, so that the impedance values thereof are respectively different functions of said variable physical magnitude, for causing the current providing means to produce a flow of energy through the coupling means, and indicating means including said coils controlled by said flow of energy in said coupling means for indicating said physical magnitude.

7. An indicating and control device for supervising a variable physical magnitude, comprising three means providing three alternating currents having a common frequency, circuit means electrically coupling said current providing means together for providing paths for a flow of energy between said current providing means, said coupling means including a coil connected between each two current providing means arranged to transfer energy between two respective current providing means, and rectifying means for rectifying the flow of current through the coils, so as to limit current flow through each of said coils to a single direction, a variable impedance means connected in circuit with each of said current providing means, the relative impedance value of said impedance means being controlled by the variable magnitude to be supervised for causing said current providing means to produce a flow of energy through the coupling means in response to said relative impedance value, and indicating means including said coils controlled by said flow of energy in said coupling means for indicating said physical magnitude.

8. An indicating and control device for supervising a variable physical magnitude, comprising three means for providing three alternating currents having a common frequency, circuit means electrically coupling said current providing means together for providing a path for a flow of energy between the current providing means, said coupling means including a coil connected between each two current providing means and rectifying means connected in series with each of said coils for limiting current flow there-through to a single direction respectively, a variable impedance means connected in circuit with each of said current providing means, the relative impedance value of said impedance means being controlled by the variable physical magnitude to be supervised for causing the current providing means to produce a flow of energy through the coupling means, and indicating means including said coils controlled by said flow of energy in said coupling means for indicating said physical magnitude.

9. An indicating and control device for supervising a variable physical magnitude, comprising three means providing three alternating currents having a common frequency, circuit means electrically coupling said current providing means together for providing paths for a flow of energy between said current providing means, a variable impedance means connected in circuit with each of said current providing means respectively, the impedance value of all said impedance means being controlled by and being respectively different functions of said variable physical magnitude to be supervised for causing the current providing means to produce currents flowing through the coupling means which currents are collectively a function of said variable physical magnitude, and a ratiometer having two coils, each coil being included in the coupling means between current providing means for energizing the coils by the flow of current through the respective coupling means, thereby varying the ratio of the currents through the coils by changes in the flow of current through the coupling means, thus causing the ratiometer to indicate said physical magnitude in response to the relative coil currents.

10. An indicating and control device, comprising three means for providing three alternating currents having a common frequency, circuit means including electric conductors electrically connecting and coupling said current providing means together for providing paths for a flow of electric current energy through the current providing means, a capacitor connected in circuit with each of the current providing means so as to control the reactance of the respective circuits, the capacitance of at least one of said capacitors being arranged to be controlled by changes of a variable physical magnitude to be measured, thereby causing the respective current providing means to produce a flow of current through the coupling means, and a ratiometer having two coils, each coil being electrically connected by said electric conductors in the coupling means between current providing means for energizing the coils by the flow of current through the respective coupling means, thereby varying the currents through the coils by changes in the flow of current through the coupling means, and causing the ratiometer to indicate said physical magnitude in response to the relative coil currents.

11. A liquid level indicating device, comprising three means for providing three alternating currents having a common frequency, circuit means electrically coupling said current providing means together for providing a path for a flow of energy between the current providing means, a capacitor having spaced electrodes connected in circuit with each of the current providing means and all the capacitors being arranged to be immersed in the liquid, the level of which is to be indicated, to an extent dependent upon the level of the liquid, the electrodes of one of said capacitors being arranged and shaped to cause changes of the relative capacitances of the capacitors in response to changes in the liquid level between the electrodes, thereby causing the current providing means to produce current flow through the coupling means, and a ratiometer having two coils, each coil being included in said coupling means between said current providing means for energizing the coils by the flow of current through the respective coupling means, thereby varying the ratio of the currents through the coils by changes in the flow of current through the coupling means, thus causing the ratiometer to indicate liquid level in response to the relative coil currents.

12. An indicating and control device for supervising the level of a dielectric liquid, comprising three means for providing three alternating currents having a common frequency, circuit means electrically coupling said current providing means together for providing a path for a flow of energy between the current providing means, a capacitor having spaced electrodes connected in circuit with each of the current providing means so as to control the reactance of the respective circuits, said capacitors all being adapted to be placed in the dielectric liquid having a varying level to be supervised and to be immersed in the liquid to an extent dependent upon such level, one electrode of one of said capacitors being differently arranged and shaped from one electrode of another of said capacitors, said differences in shape and arrangement being such as to cause predetermined characteristic variations in capacitance differences between two respective capacitors in response to changes of the level of the dielectric liquid between the electrodes, thereby causing the current providing means to produce current flow through the coupling means, and a ratiometer having at least two coils, each coil being included in the coupling means between current providing means for energizing the coils by the flow of current through the respective coupling means, thereby varying the ratio of the currents through the coils by changes in the flow of current through the coupling means, thus causing the ratiometer to indicate the level of the liquid in response to the relative coil currents.

13. An indicating and control device for supervising the level of a dielectric liquid, comprising three oscillators capable of being synchronized as to frequency, circuit means electrically coupling said oscillators together for providing a path for a flow of energy between said oscillators, a ratiometer including three coils, each of said coils being included in the coupling means between two of said oscillators, and a capacitor connected in circuit with each oscillator for controlling the reactances of the respective oscillator circuits, said capacitors having spaced electrodes and all being adapted to be placed in the dielectric liquid and to be immersed in such liquid to an extent dependent upon said level, one electrode of each capacitor having a different width at each level of the liquid, the differences in the widths of two electrodes of each two capacitors varying in an approximately sinusoidal manner with the level of the liquid, thereby causing the oscillators to produce current flow through the respective coupling means including the coils of the ratiometer, the ratiometer being controlled by the differences of the relative coil currents, thereby indicating the level of the dielectric liquid in which the capacitors are placed.

14. An indicating and control device for supervising a variable physical magnitude comprising a transformer having a primary winding connected to be energized by alternating current and having a plurality of secondary windings constituting a plurality of means for providing a plurality of alternating currents, a plurality of means for electrically coupling said secondary windings together, a variable impedance means connected in circuit with each of said secondaries, the relative impedance values of each of said impedance means being respectively directly and automatically controlled by said variable physical magnitude for causing the voltages of the secondaries to shift in phase relative to each other for producing flows of energy through the coupling means, said relative impedance value controlling the ratio of said flows of energy through the coupling means, and indicating means controlled by the ratio of said flows of energy through the coupling means.

15. A liquid level responsive device, comprising a plurality of capacitors fixed relative to each other and all arranged to be immersed in the same liquid to be measured to an extent dependent upon the liquid level, each of said capacitors including an electrode shaped differently from one of the electrodes of each of the other capacitors for causing said capacitors to vary their capacitances differently as the liquid level changes, the relative capacitance of the capacitors varying as a function of the configurations of the electrodes in response to a change of the liquid level, similar first circuit means connected respectively to each of said capacitors for energizing the same, second circuit means comprising coupling circuits connected between said first circuit means and providing circuit paths for the flow of current between said first circuit means incident to relative different capacitance values of said capacitors, and means actuated by and responsive to current flow through said second circuit means and hence responsive to liquid level.

16. A liquid level responsive device, comprising a plurality of capacitors positionally fixed relative to each other and all arranged to be immersed in the same liquid to be measured to an extent dependent upon the liquid level, each of said capacitors including an electrode having a different width at different liquid levels, the differences in the widths of the differently shaped electrodes of each two capacitors varying in an approximately sinusoidal manner in the direction of liquid level changes in such manner as to cause the said capacitors to vary their capacitances differently as the liquid level changes, the relative capacitance of said capacitors varying as a function of the configurations of the electrodes in response to a change of the liquid level, similar first circuit means connected respectively to each of said capacitors for energizing the same, second circuit means comprising coupling circuits connected between said first circuit means and providing circuit paths for the flow of current between said first circuit means incident to relative different capacitance values of said capacitors, and means actuated by and responsive to current flow through said second circuit means and hence responsive to liquid level.

17. A measuring device for measuring the relative position of relatively movable bodies, comprising a transmitter including a capacitor unit of three capacitors, each composed of two electrodes and the dielectroc, one electrode of each capacitor being shaped differently from one of the electrodes of each of the other capacitors for causing the said capacitors to have different capacitances in response to the same relative position of the respective capacitor components, one component of each capacitor mounted for movement in unison with the corresponding component of the other capacitors, the simultaneously movable capacitor components being operatively connected with one of said bodies for joint displacement in response to a variation of the relative position of the bodies for causing the capacitors to vary their relative capacitance as a function of the configurations of the electrodes in response to a variation of the relative position of the bodies, first circuit means connected respectively to said capacitors for energizing the same, second circuit means connected to the first circuit means for energizing the second circuit means corresponding to the relative capacitance values of said capacitors, and a receiver comprising a ratiometer type indicator connected with the second circuit means and controlled by the relative capacitance values of said capacitors.

18. A measuring device for measuring the relative position of relatively movable bodies, comprising a transmitter including a capacitor unit of three capacitors, each composed of two electrodes and the dielectric, one electrode of each capacitor having a configuration varying in width, the differences in the widths of the differently shaped electrodes of each two capacitors varying in an approximately sinusoidal fashion for causing the said capacitors to have different capacitances in response to the same relative position of the respective capacitor components, one component of each capacitor mounted for movement in unison with the corresponding component of the other capacitors, the simultaneously movable capacitor components being operatively connected with one of said bodies for joint displacement in response to a variation of the relative position of the bodies for causing the capacitors to vary their relative capacitance as a function of the configurations of the electrodes in response to a variation of the relative position of the bodies, first circuit means connected respectively to said capacitors for energizing the same, and second circuit means connected with the first circuit means for energizing the second circuit means corresponding to the relative capacitance values of said capacitors, and a receiver comprising a ratiometer type indicator connected with the second circuit means and controlled by the relative capacitance of said capacitors.

19. Apparatus for indicating the magnitude of a physical condition, which is capable of variations between predetermined limits, comprising three variable condensers all arranged to be varied simultaneously as to capacitance by the magnitude of said physical condition and each having a respectively different characteristic curve of capacitance in respect to the change of the magnitude of said physical condition between the predetermined limits thereof, similar first alternating current circuit means connected respectively to each of said variable condensers for energizing it, so that the reactance of each of said first circuit means is controlled by the capacitance of the respectively associated condenser in response to the magnitude of said physical condition, a second circuit means comprising three coupling circuits connected between said first circuit means and providing circuit paths for the flow of electric current between said first circuit means incident to relative unbalance of the reactances of said first circuit means, and means movable in a predetermined path and arranged to be positioned in said path in accordance with current flow in said second circuit means for indicating the magnitude of said physical condition.

ABRAHAM EDELMAN.

REFERENCES CITED

The following references are of record in the file of this patent:

UNITED STATES PATENTS

| Number | Name | Date |
|---|---|---|
| 1,610,179 | Thompson | Dec. 7, 1926 |
| 1,970,442 | Wittkuhns et al. | Aug. 14, 1934 |
| 2,149,756 | Arenberg | Mar. 7, 1939 |
| 2,200,863 | Schuck | May 14, 1940 |
| 2,248,661 | Culver | July 8, 1941 |
| 2,294,797 | Nelson | Sept. 1, 1942 |
| 2,298,893 | Macintyre | Oct. 13, 1942 |
| 2,300,562 | Freystedt | Nov. 3, 1942 |
| 2,377,275 | Smith | May 29, 1945 |

FOREIGN PATENTS

| Number | Country | Date |
|---|---|---|
| 385,265 | Great Britain | Mar. 13, 1930 |
| 481,103 | Great Britain | Feb. 28, 1938 |
| 441,576 | Great Britain | Jan. 22, 1936 |
| 243,318 | Great Britain | Dec. 20, 1926 |
| 464,346 | Germany | Aug. 18, 1928 |

Certificate of Correction

Patent No. 2,544,012                                                     March 6, 1951

ABRAHAM EDELMAN

It is hereby certified that error appears in the printed specification of the above numbered patent requiring correction as follows:

Column 1, line 3, for the word "circular" read *circuit*; column 2, line 7, before "circuit" insert *a*; column 8, line 36, after "changes of" insert *all*; column 14, line 14, after "variable" insert *physical*; column 17, line 27, for "dielectroc" read *dielectric*;

and that the said Letters Patent should be read as corrected above, so that the same may conform to the record of the case in the Patent Office.

Signed and sealed this 15th day of May, A. D. 1951.

[SEAL]

THOMAS F. MURPHY,
*Assistant Commissioner of Patents.*